United States Patent [19]

Thomson

[11] Patent Number: 4,630,647
[45] Date of Patent: Dec. 23, 1986

[54] PIPE REPAIR CLAMP

[75] Inventor: David G. Thomson, Cambridge, Canada

[73] Assignee: Waltec Inc., Cambridge, Canada

[21] Appl. No.: 802,470

[22] Filed: Nov. 27, 1985

[30] Foreign Application Priority Data

Jan. 2, 1985 [CA] Canada ................................. 471308

[51] Int. Cl.⁴ ............................................. F16L 55/16
[52] U.S. Cl. ........................................ 138/99; 24/279; 285/417
[58] Field of Search ................... 138/92, 99; 285/417; 24/17 A, 279, 280

[56] References Cited

U.S. PATENT DOCUMENTS

| 1,684,666 | 9/1928 | Frazier | 138/99 X |
| 3,334,388 | 8/1967 | Turbyfill | 24/279 |
| 4,381,020 | 4/1983 | Daghe et al. | 138/99 |

FOREIGN PATENT DOCUMENTS

| 718723 | 9/1965 | Canada . | |
| 719944 | 10/1965 | Canada . | |
| 726521 | 1/1966 | Canada . | |
| 918581 | 1/1973 | Canada . | |
| 920074 | 1/1973 | Canada . | |
| 928650 | 6/1973 | Canada . | |
| 936481 | 11/1973 | Canada . | |
| 978488 | 11/1975 | Canada . | |
| 1004610 | 2/1977 | Canada . | |
| 1346600 | 11/1963 | France | 285/417 |
| 251728 | 5/1926 | United Kingdom | 24/279 |

Primary Examiner—Stephen Marcus
Assistant Examiner—Mark Thronson
Attorney, Agent, or Firm—Russel S. Smart; Vance Marston; Stewart L. Gitler

[57] ABSTRACT

A clamp which comprises a metal band adapted to be wrapped around a pipe over a suitable gasket. The longitudinal edges of the band are secured to lug bars, one having fingers secured to it and the other having threaded bolts secured to it. The free ends of the bolts are each provided with a nut and washer soldered together to form a nut/washer combination. Each finger is generally U-shaped including a base portion and two leg portions. The bottom edges of the legs adjacent their free ends are welded to a lug bar. The legs converge over a part of their length from a first spacing in the region of the base portion sufficient to accommodate a nut/washer to a second spacing in the region of the lug bar sufficient to accommodate a bolt but not a nut/washer. The top edges of the converging parts of the legs slope outwardly with respect to the bottom edges. The legs have flat ends to accommodate a nut/washer and tabs adjacent the top edges restrain the nut/washer against outward movement while the nut is tightened. During initial closing of the clamp, the legs guide the nut/washer to keep the bolt properly aligned. After the nuts are tightened to a predetermined torque, the solder joints between the nuts and washers break and the nuts are then tightened to a higher torque with the solder acting as a low friction antigall surface between the nuts and washers.

8 Claims, 9 Drawing Figures

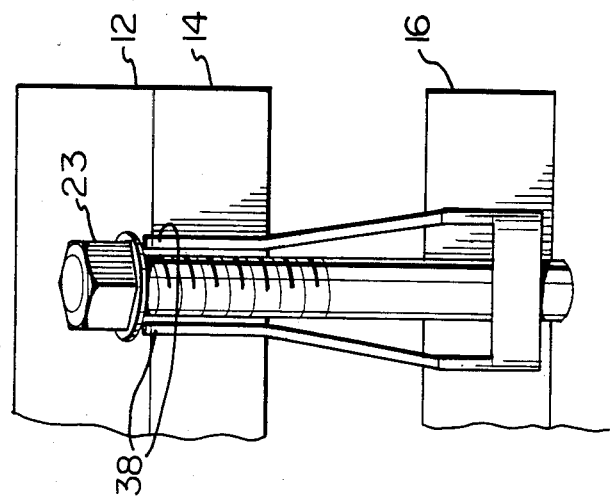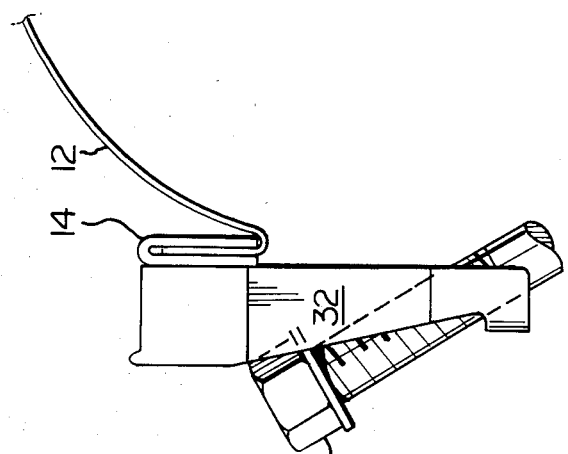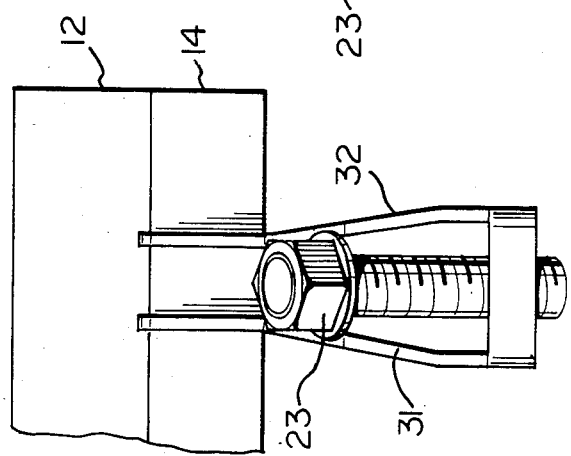

PIPE REPAIR CLAMP

BACKGROUND OF THE INVENTION

This invention relates to a pipe repair clamp and in particular to a flexible band repair clamp for repairing breaks in water or sewer mains.

Watermains and sewer force mains are made of various materials such as cast iron, ductile iron, asbestos cement, P.V.C., steel and, in some municipalities, wood. In the event of a break in a mains, a repair is necessary, and one known method of doing this is with a flexible band repair clamp. Many types of repair clamp are known in the art but basically they comprise a one or two piece flexible metal band which encircles a break in a pipe and means to tightly draw the band edges together so as to tightly comprise a gasket around the pipe over the break and on both sides of the break.

Clamping pressure is achieved by tightening nuts on threaded studs or bolts which draw together lug bars secured to the longitudinally extending edges of the metal band, as is well known to those skilled in the art. Some designs use lugs welded to each lug bar with bolts extending through openings in the lugs and some use bolts welded to one lug bar and passing through lugs welded to the other lug bar. In some designs proper alignment of the bolts during the initial installation procedure is difficult and normally requires the efforts of two people. Two piece band arrangements, with diametrically opposite lug arrangements, are difficult for one person to install.

Canadian Pat. No. 719,944 discloses a clamp consisting of two bands and having lugs curved on the front to allow a nut to slide along and snap into place on a flat face. There are, however, no projections to retain the nuts and the guide fingers do not have dual tapers as do the fingers of the present invention. Installation would appear to be considerably more difficult than the clamp of the present invention.

Canadian Pat. No. 726,521 discloses a clamp comprising a one-piece band with the edges bent back and fitted into slots in the lugs. There is no disclosure of the dual-taper feature of this invention and installation appears to be more difficult. There do not appear to be projections to hold the nut washer combination in position for tightening.

Canadian Pat. No. 918,581 shows a clamp having lugs on a base section which are bifurcated to accept the shank of a bolt. The lugs have tabs to keep the bolts from lifting out of the lugs. It does not disclose the dual-guide system of the present invention so that installation would appear to be more difficult.

SUMMARY OF THE INVENTION

The clamp according to the present invention can be installed by one person because it uses a unique design of lug or "finger" which is generally U-shaped and includes a base portion (cross-bar) and two legs extending from the base portion. The legs converge away from the base portion and slope outwardly to provide a dual guide system. The converging legs center and guide the threaded stud (bolt) and attached nut/washer combination and the outwardly sloping parts of the legs lift the stud assembly until it reaches its final installation position.

In the closed position the washers rest on the ends of the legs which are flat and have tabs (projections) at their outer edges to retain the washers (and hence the bolts) against outward movement.

According to a broad aspect of the invention there is provided a pipe repair clamp comprising a metal band adapted to be wrapped around a pipe and having first and second longitudinally extending edge portions secured to first and second lug bars, said first lug bar having attached to it a plurality of fingers and said second lug bar having attached to it a plurality of threaded bolts each provided with a nut/washer assembly, each finger being generally U-shaped including a base portion and two leg portions extending from said base portion, said leg portions having top and bottom edges and first and second ends, said first ends being adjacent said base portion, said bottom edges being secured to said first lug bar adjacent said second ends, said leg portions converging over a part of their length from a first spacing in the region of said base portion sufficient to accommodate a nut/washer to a second spacing in the region of said first lug bar sufficient to accommodate a bolt but not a nut/washer, said top edges sloping outwardly with respect to said bottom edges along said part of the length of said leg portions, said second ends being substantially flat and having tabs in the region of said top edges, said flat ends accommodating said washers and said tabs restraining said washers against outward movement when said clamp is closed.

The fingers are of one-piece construction and are easy to weld to the lug bars because only one piece has to be positioned and held for welding. The fingers, being one-piece, may be made of relatively thin material, resulting in low cost.

To install the clamp according to the invention, it is wrapped around the pipe over a neoprene gasket preferably having a finger type joint and the nut/washer combinations on the ends of the bolts are hooked on the cross bars of the fingers. This semi-closed position allows the installer to place the clamp either directly over the break or beside it. In the latter case, the clamp and, of course, the gasket, can then be slid along the pipe until it is over the break to be repaired without danger of twisting the fingers of the rubber sealing gasket. Proceeding in this manner is advantageous if water is gushing out of a break with some force or in volume. This procedure is not readily possible with existing clamps which should be installed directly over the break. This is because once they are assembled the rubber sealing gasket is basically closed and any sideways movement could twist the tapered lap ends (if used) or fingers of the rubber gasket and not allow a proper seal.

After the clamp according to the invention is positioned over the break to be sealed, the lug bars are pushed together and the fingers guide the nut/washer combinations up and over the ends of the fingers. The nut/washer combinations are then pushed toward the pipe over two tabs or projections which retain them in position for tightening. The nuts are tightened to tightly close the clamp over the gasket, thus sealing the break in the pipe.

Although the clamp is described herein as being for the repair of breaks in pipes it can also be used to couple two plain end pieces of pipe.

BRIEF DESCRIPTION OF THE DRAWINGS

FIGS. 3A and 3B are views similar to those of FIGS. 2A and 2B showing the fastening means after movement towards the final closed position, FIGS. 4A and 4B are views similar to those of FIGS. 2A and 2B showing the fastening means almost at the final closed position.

DESCRIPTION OF THE PREFERRED EMBODIMENT

Figure 1:
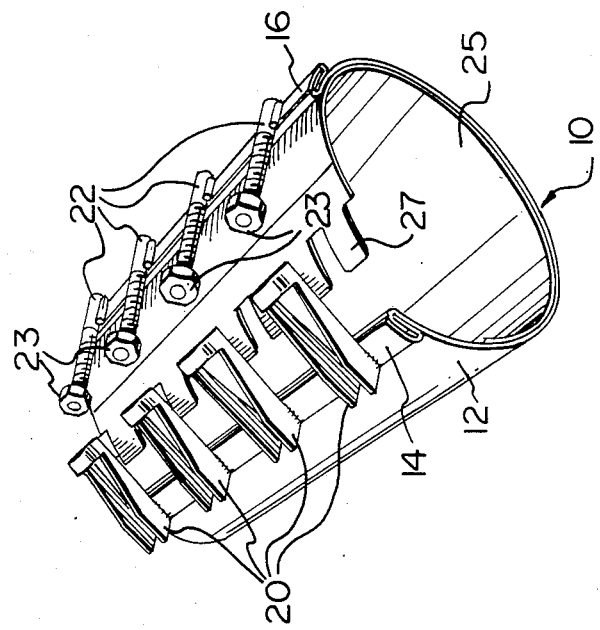
FIG. 1 is a perspective view of a clamp according to the invention and provided with a clamping gasket.

Referring to FIG. 1, the clamp 10 according to the invention is seen to comprise a metal band 12, preferably stainless steel, having longitudinally extending edges provided with lug bars 14 and 16. The lug bar 14 has a plurality of fingers 20 welded to it and the lug bar 16 has a plurality of threaded studs or bolts 22 welded to it, the bolts being provided with nut/washer combinations 23 better seen in the other drawing figures. All parts of the clamp including the lug bars, fingers, bolts, nuts and washers are preferably formed of stainless steel with all weld joints passivated to resist corrosion.

The clamp is used with a resilient gasket 25, preferably of neoprene and preferably having a finger type joint with interlocking fingers 27. Rubber sealing gaskets are commonly available in either a flat type or with a grid pattern. The gasket ends available are tapered end (lap) type or interlocking finger type. With the clamp according to the present invention it is preferred to use a neoprene gasket with interlocking fingers. The gasket can be cut to any desired length whereas grid pattern gaskets have to be molded in a variety of sizes, for different clamp sizes, resulting in large inventories. Finger gaskets give slightly better test performance than a lap type because the zigzag joint resists water flow across the connection. Full gasket thickness right to the edges of the finger joint resists gasket tear or folding during installation.

The nut/washer combinations are initially soldered together by a ring of solder placed in a groove in the washer (to prevent solder reaching the threads of the nut). During the final installation step in which the nuts are tightened securely the solder joints break. The solder then provides a bearing surface for the nut on the now stationary washer and also provides an anti-gall surface. By this means, the clamp will seal a higher water pressure at a given assembly torque as compared to an arrangement without the solder.

Figures 2A, 2B:
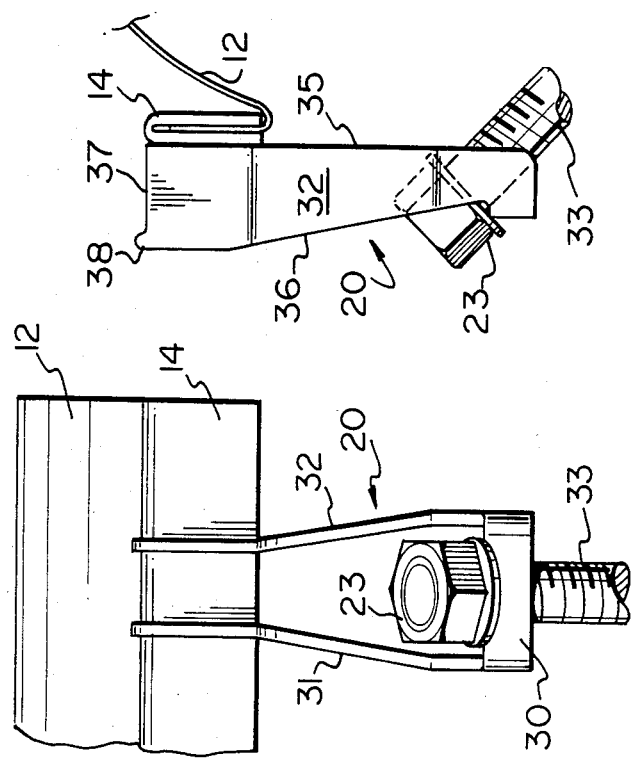
FIGS. 2A and 2B are front and side elevational views of part of the clamp showing one of the fastening means in the semiclosed position.

FIGS. 2A and 2B show the clamp in the semi-closed position with the band 12 wrapped around a gasket and pipe (not shown). In this position, the nut/washer combinations 23 are hooked over the cross bars 30 of the fingers 20. If necessary, the clamp and gasket can be slid along the pipe because the band is not tight on the pipe.

As is apparent from FIG. 2A, the finger 20 is generally U-shaped and includes a base portion (cross bar) 30 and two leg portions 31 and 32 extending from the base portion 30.

It can be seen that the leg portions 31 and 32 converge over a part of their length from a first spacing in the region of the base portion 30 sufficient to accomodate the nut/washer combination 23 to a second spacing in the region of the lug bar 14 sufficient to accommodate a bolt 33 but not the nut/washer combination 23.

The bottom edges 35 of the leg portions 31 and 32 are welded to the lug bar 14 adjacent the free ends of the leg portions. As can be seen in FIG. 2B, the top edges 36 of the leg portions 31 and 32 slope outwardly with respect to their bottom edges. The ends 37 of the leg portions are substantially flat and have tabs 38, the purpose of which will become clear later in this discussion.

FIGS. 3A and 3B show the structure after partial movement towards the final closed position. The nut/washer combination 23 is guided upwardly and outwardly by the converging/sloping legs 31 and 32, thus maintaining proper alignment of the bolts with the fingers during closing of the clamp.

Figure 4B:
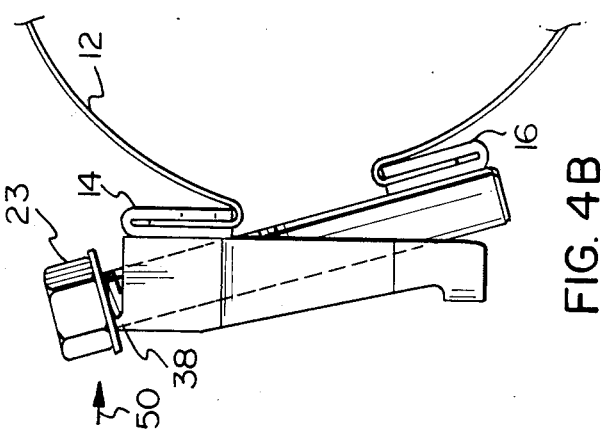

FIGS. 4A and 4B show the structure just before the final position with the nut/washer combination 23 resting on the tube or projections 38. By pushing in the direction of arrow 50, the fastening arrangement is moved to the final position shown in FIGS. 5A and 5B in which the nut/washer combination 23 is restrained against outward movement by tabs 38. All that remains to be done is to tighten the nuts to a predetermined recommended torque.

Figure 5B:
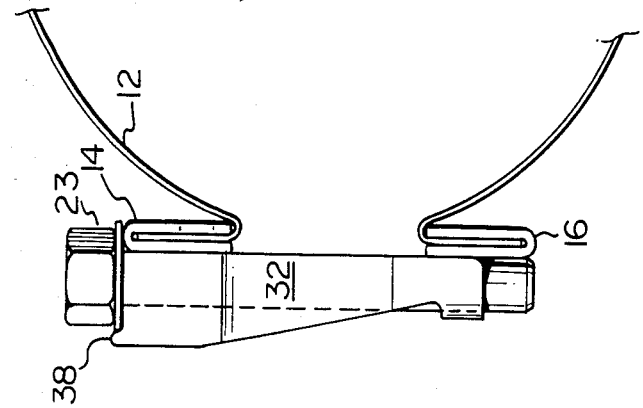
FIGS. 5A and 5B are views similar to those of FIGS. 2A and 2B showing the fastening means in the final closed position.
Figure 5A:
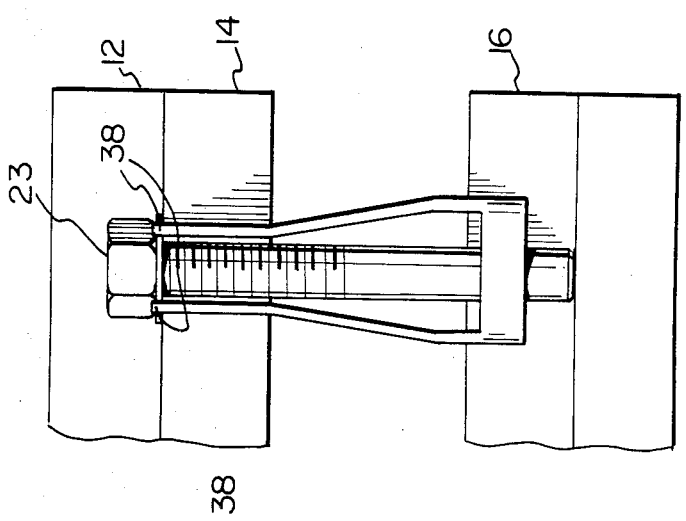

As best seen in FIGS. 5A and 5B the edges of the band 12 are folded back and held in slots in the lug bars 14 and 16, rather than being welded to them. This ensures a sturdy but flexible connection.

The clamp according to the invention can be installed without disassembly or removal of any parts including the nut/washer assemblies. The tapered finger design allows the nut/washer assemblies to hook the mating studs to the fingers in a semi-closed position, freeing the installer's hands to slide the clamp into position over a break.

What I claim as my invention is:

1. A pipe repair clamp comprising a metal band adapted to be wrapped around a pipe and having first and second longitudinally extending edge portions and first and second lug bars, said first and second longitudinally extending edge portions being secured to said first and second lug bars, said first lug bar having attached to it a plurality of fingers and said second lug bar having attached to it a plurality of threaded bolts each provided with a nut/washer assembly, each finger being generally U-shaped including a base portion and two leg portions extending from said base portion, said leg portions having top edges and bottom edges and first and second ends, said first ends being adjacent said base portion, said bottom edges being secured to said first lug bar adjacent said second ends, said leg portions converging over a part of their length from a first spacing in the region of said base portion sufficient to accommodate one of said nut/washer assemblies to a second spacing in the region of said first lug bar sufficient to accommodate one of said bolts but not said one of nut/washer assemblies, said top edges sloping outwardly with respect to said bottom edges along said part of the length of said leg portions, said second ends being substantially flat and having tabs in the region of said top edges, said flat ends accommodating said washers and said tabs restraining said washers against outward movement when said clamp is closed.

2. A clamp as claimed in claim 1 wherein said metal is stainless steel.

3. A clamp as claimed in claim 2 wherein said longitudinally extending edge portions are folded back, said lug bars include slots and said longitudinally extending edge portions are retained in said slots in said lug bars.

4. A clamp as claimed in claim 3 wherein said fingers are welded to said first lug bar and said bolts are welded to said second lug bar.

5. A clamp as claimed in claim 4 wherein all welds are passivated.

6. A clamp as claimed in claim 5 wherein said lug bars, bolts, and nut/washer assemblies are formed of stainless steel.

7. A clamp as claimed in claim 5 and further comprising a flat neoprene gasket with a finger type joint.

8. A clamp as claimed in claim 7 wherein each of said nut/washer assemblies comprises a nut soldered to a washer.

* * * * *